United States Patent
Watrous

(10) Patent No.: US 8,329,122 B1
(45) Date of Patent: Dec. 11, 2012

(54) METHOD FOR PRODUCTION OF AN ISOTOPICALLY ENRICHED COMPOUND

(75) Inventor: Matthew G. Watrous, Idaho Falls, ID (US)

(73) Assignee: The United States of America, as represented by the Department of Energy, Washington, DC (US)

( * ) Notice: Subject to any disclaimer, the term of this patent is extended or adjusted under 35 U.S.C. 154(b) by 676 days.

(21) Appl. No.: 12/495,843

(22) Filed: Jul. 1, 2009

(51) Int. Cl.
*C01G 47/00* (2006.01)

(52) U.S. Cl. .......................... 423/2; 423/249

(58) Field of Classification Search ............. 423/2, 249; 62/601, 919; 250/432 PD
See application file for complete search history.

(56) References Cited

U.S. PATENT DOCUMENTS

| | | | |
|---|---|---|---|
| 4,280,053 A | | 7/1981 | Evans et al. |
| 4,859,431 A | | 8/1989 | Erhardt |
| 4,980,093 A | * | 12/1990 | Ohtsuka et al. ............. 588/20 |
| 4,990,787 A | | 2/1991 | Vanderheyden et al. |
| 5,617,860 A | * | 4/1997 | Chupp et al. ............. 600/420 |
| 5,860,295 A | * | 1/1999 | Cates et al. ............. 62/637 |
| 6,202,440 B1 | * | 3/2001 | Hayashida et al. ............. 62/617 |
| 7,023,000 B2 | | 4/2006 | Zyuzin |
| 7,302,812 B2 | | 12/2007 | Okasinki et al. |
| 7,531,150 B2 | * | 5/2009 | Bray et al. ............. 423/2 |
| 2005/0044886 A1 | * | 3/2005 | Okasinski et al. ............. 62/617 |

OTHER PUBLICATIONS

A.N. Mosevich, et al., Chromatographic separation of certain oxygen compounds of xenon and iodine, Radiokhimiya, Nov.-Dec. 1965, pp. 678-687 (Russia).

I.S. Kirin, et al., Use of the Method of Thin-Layer Chromatography for the Separation of Xenon Trioxide from Oxygen-Containing Iodine Compounds, Radiokhimiya, May-Jun. 1970, pp. 500-505 (Russia).

* cited by examiner

*Primary Examiner* — Steven Bos
(74) *Attorney, Agent, or Firm* — Mark C. Lang; Brian J. Lally; John T. Lucas

(57) ABSTRACT

A method is presented for producing and isolating an isotopically enriched compound of a desired isotope from a parent radionuclide. The method includes forming, or placing, a precipitate containing a parent radionuclide of the desired daughter isotope in a first reaction zone and allowing sufficient time for the parent to decay into the desired gaseous daughter radioisotope. The method further contemplates collecting the desired daughter isotope as a solid in a second reaction zone through the application of temperatures below the freezing point of the desired isotope to a second reaction zone that is connected to the first reaction zone. Specifically, a method is presented for producing isotopically enriched compounds of xenon, including the radioactive isotope Xe-131m and the stable isotope Xe-131.

29 Claims, 1 Drawing Sheet

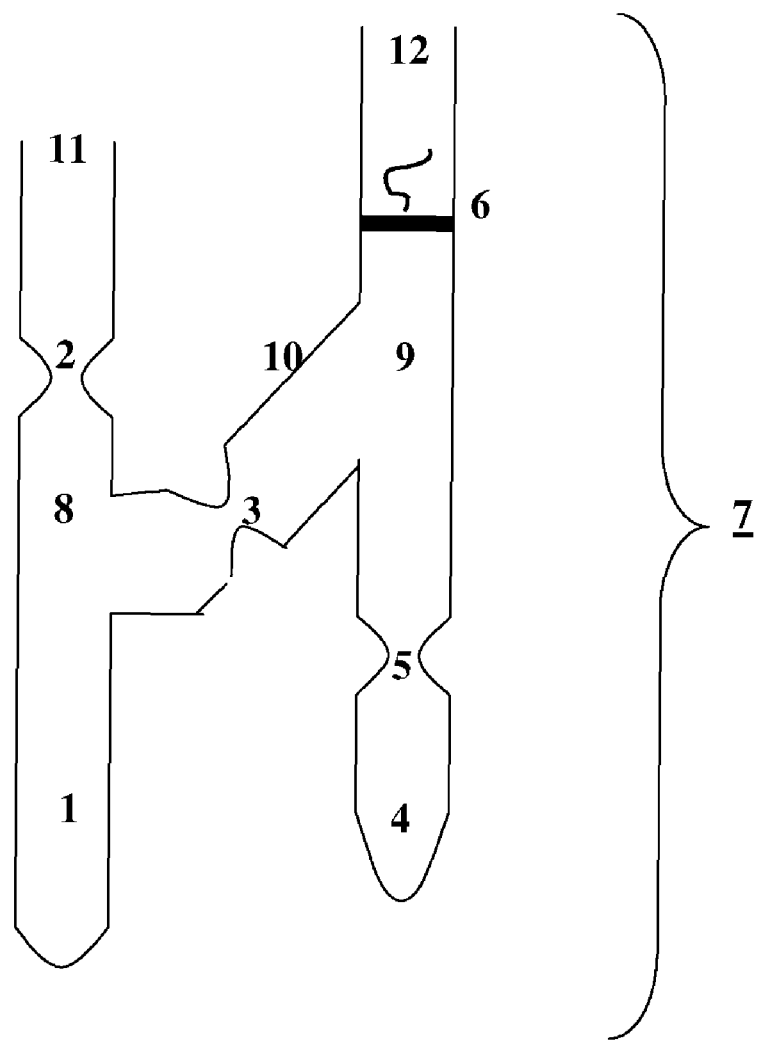

METHOD FOR PRODUCTION OF AN ISOTOPICALLY ENRICHED COMPOUND

GOVERNMENT INTERESTS

The United States Government has rights in this invention pursuant to Contract No. DE-AC07-05ID14517, between the U.S. Department of Energy (DOE) and Battelle Energy Alliance, representing Idaho National Laboratory (INL).

FIELD OF THE INVENTION

The present invention relates to a method for the production of isotopically enriched compounds of a desired isotope. One embodiment of the present invention relates to a method for the production of an isotopically enriched compound of various isotopes of xenon. More particularly, one embodiment of the present invention relates to a method for the production of an isotopically enriched compound of the radioactive isotope Xe-131m; while another embodiment is directed to production of the stable isotope Xe-131.

BACKGROUND

Xenon is a colorless, heavy, odorless noble gas with nine naturally occurring, stable isotopes. Xenon is naturally present in the Earth's atmosphere at a concentration of 0.09 parts per million by volume. Naturally occurring atmospheric xenon is comprised of approximately 21% of the isotope Xe-131 (Xe-131). Of particular interest to the present invention, Xenon-131 is one of xenon's stable isotopes, while Xe-131m is a metastable, radioactive isotope which decays to the ground state of Xe-131 through a 163.9 keV isomeric transition. Xenon-131m has a half-life of approximately 11.8 days.

Xe-131 is a product of multiple processes. In one process, Xe-131 is produced from the decay of I-131. In another process, Xe-131 is formed as a fission product of both U-235 and Pu-239, and is therefore useful as an indicator of nuclear explosions. Xenon that is a product of fission is commercially available; however, it contains up to five different isotopes of xenon that requires separation through physical means with a mass separator or other similar instrument in order to obtain a pure form of a specific isotope. Commercial fission product xenon cannot be separated via chemical means.

In the past twenty-five years, one xenon isotope—xenon-129 (Xe-129)—has proved to be particularly effective for use in nuclear magnetic resonance (NMR) spectroscopy and in magnetic resonance imaging (MRI) applications. See e.g., Ripmeester, J. A., *J. Am. Chem. Soc.* (1982), 104, 289 and U.S. Pat. No. 5,617,860 issued to Chupp, et al. With respect to NMR, Xe-129 is useful as a probe of void space in solids. Specifically, Xe-129, with a spin S=1/2, can provide information about the symmetry and structure of internal surfaces because the isotropic chemical shift is sensitive to void size while the anisotropic shift is sensitive to void symmetry.

More recently, Xe-131 has been investigated as a potential NMR probe of void space. While use of Xe-131 in NMR spectroscopy of solid phases has its challenges due to its low natural abundance (21.2% of atmospheric xenon), low resonance frequency (24.6 MHz in a magnetic field of 7.05 T), relatively large quadrupole moment ($-0.12 \times 10^{-24}$ cm$^2$) and its NMR sensitivity (10% that of 129-Xe), it has proven to be a powerful probe that can provide unique information about a void space. In addition, Xe-131 has a spin S=3/2 and, thus, a quadrupolar moment that can be exploited to provide valuable information that cannot be obtained from Xe-129 NMR.

Thus far, Xe-131 has been used, among other uses, in NMR applications to provide information on relaxation due to fluctuating electric fields, as a contrast agent for microimaging aerogels, to probe the distortion of the atomic electron density by an external magnetic field, and to investigate macroscopic void space through quadrupolar coupling.

In addition, the radioactive isotope Xe-131m has proven useful for energy calibration on gamma counting equipment due to its production of an electron at 164 keV. Consequently, isotopically pure Xe-131m allows for the absolute determination of 164 keV on gamma ray counting equipment.

As discussed above, Xe-131 and Xe-131m can be useful in a number of applications. The previously described applications of Xe-131 are purely exemplary and are not meant to be limiting. One of ordinary skill in the art will appreciate additional uses of Xe-131 and Xe-131m that are not described above.

As additional uses of Xe-131 and Xe-131m become known and are more commonly utilized, it is desirable to have an easy, efficient and safe manner in which to obtain isotopically enriched compounds of Xe-131 and Xe-131m, as well as other isotopes of various elements. Previous methods that have been utilized to separate xenon from other compounds, or produce Xe-131 specifically, are deficient for a number of reasons, including that they are laborious, inefficient and require large amounts of starting material, thus increasing personnel exposure to potentially harmful compounds.

The general mechanism by which Xe-131 and Xe-131m are currently produced is through the beta decay of iodine-131 (I-131), a radioisotope of iodine. Iodine-131, with a half-life of approximately 8 days, decays to Xe-131 (99%) and Xe-131m (1%). Xenon-131 is a stable isotope, while Xe-131m is a metastable state which decays to the ground state of Xe-131 and has a half-life of approximately 11.8 days.

The prior methods for obtaining isotopes of xenon rely on a number of techniques and starting materials, but essentially rely on the decomposition of iodine described above. As a radioisotope of iodine, I-131 decays naturally to Xe-131 through the emission of beta particles (606 keV) and gamma rays (364 keV), as exhibited by the following equation:

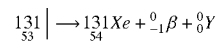

$$^{131}_{53}I \longrightarrow ^{131}_{54}Xe + ^{0}_{-1}\beta + ^{0}_{0}\gamma$$

Consequently, in producing Xe-131 and Xe-131m, there is the potential that personnel could be exposed to radiation in the process of producing radioactive Xe-131m and the stable isotope Xe-131.

As reflected in Table 1, the decay of I-131 produces a maximum amount of Xe-131m around approximately 14 days. Thereafter, Xe-131m decays to Xe-131 through the 164 keV transition.

TABLE 1

Decay of I-131 and Activity of Xe-131m

| Day | I-131 (Ci) | Xe-131m (Ci) |
|---|---|---|
| 0 | 1.00E+00 | 0.00E+00 |
| 1 | 9.17E−01 | 5.42E−04 |
| 2 | 8.41E−01 | 1.01E−03 |
| 3 | 7.72E−01 | 1.41E−03 |
| 4 | 7.08E−01 | 1.75E−03 |
| 5 | 6.49E−01 | 2.03E−03 |

TABLE 1-continued

Decay of I-131 and Activity of Xe-131m

| Day | I-131 (Ci) | Xe-131m (Ci) |
|---|---|---|
| 6 | 5.95E−01 | 2.27E−03 |
| 7 | 5.46E−01 | 2.46E−03 |
| 8 | 5.01E−01 | 2.62E−03 |
| 9 | 4.59E−01 | 2.74E−03 |
| 10 | 4.21E−01 | 2.83E−03 |
| 11 | 3.87E−01 | 2.90E−03 |
| 12 | 3.55E−01 | 2.95E−03 |
| 13 | 3.25E−01 | 2.97E−03 |
| 14 | 2.98E−01 | 2.98E−03 |
| 15 | 2.74E−01 | 2.97E−03 |
| 16 | 2.51E−01 | 2.95E−03 |
| 17 | 2.30E−01 | 2.92E−03 |
| 18 | 2.11E−01 | 2.88E−03 |
| 19 | 1.94E−01 | 2.83E−03 |
| 20 | 1.78E−01 | 2.78E−03 |
| 21 | 1.63E−01 | 2.72E−03 |

Xenon can be separated from iodine by a variety of methods. One such method is through the separation of Xe-131m bound to xenon oxides. *Chromatographic separation of certain oxygen compounds of xenon and iodine*, A. N. Mosevich, N. P. Kuzentsov, Y. G. Gusev, translated from *Radiokhimiya*, vol. 7, no. 6, pp. 678-687 (November-December 1965). In that method, chemically bound Xe-131m was chromatographically isolated in a pure form with the aid of a $XeO_3$ carrier. However, this method is laborious and leaves behind a substantial amount of unrecovered Xe-131m isotope.

In addition, thin-layer, ion-exchange and paper chromatography, as well as electrophoresis, have been used as methods to separate Xe-131m-labeled $XeO_3$ from iodine compounds. *Use of the Method of Thin-Layer Chromatography for the Separation of Xenon Trioxide from Oxygen-Containing Iodine Compounds*, I. S. Kirin, V. K. Isupov, Y. K. Gusev, translated from *Radiokhimiya*, vol. 12, no. 3, pp. 500-505 (May-June 1970). However, this method does not recover a pure form of Xe-131m or Xe-131.

Similarly, one exemplary process used by the present inventor for producing Xe-131m starts with venting and capping a bottle containing I-131 in a basic solution, such as sodium hydroxide. The bottle is placed in a chamber that has an inlet for helium, or other sweep gas, and an outlet to a trap containing charcoal. The sodium hydroxide solution containing I-131 undergoes beta decay to produce Xe-131m in the headspace of the capped bottle. A maximum amount of Xe-131m is produced approximately 14 days after the commencement of trapping the xenon, as shown in Table 1 above. After this time, the bottle is opened in the chamber and helium is introduced into the chamber in order to sweep the Xe-131 onto a charcoal trap. This method isolates Xe-131m, but also recovers amounts of I-131 which require further chromatographic separation.

The stable isotope Xe-131 is obtained in a similar manner by allowing the I-131 to decay for a longer period of time in order to produce Xe-131 that is essentially free of Xe-131m.

However, a number of problems arise that make this method unattractive for maximum recovery of isotopically pure Xe-131m. First, in sweeping the chamber, significant amounts of I-131 are also swept onto the charcoal trap. I-131 must then be separated from Xe-131m or Xe-131 through chromatographic means, which is inefficient at collecting the maximum amount of Xe-131m or Xe-131. For example, approximately one-third of the Xe-131m can be lost during the chromatographic separation. Second, a substantial amount of Xe-131m remains on the charcoal trap unrecovered after heating. Finally, a significant amount of Xe-131m is left behind in the sodium hydroxide solution due to the solubility of xenon in water. Thus, in order to recover an adequate amount of Xe-131m, a substantial amount of the starting material containing I-131 is necessary. For example, more than approximately 100 mCi of I-131 is required in order to recover a measurable amount of Xe-131m. Moreover, this method is not an improvement over prior methods because it still requires the step of separating I-131 from Xe-131m via chromatographic means, which is time consuming and laborious.

The foregoing methods of separation and production of Xe-131 or Xe-131m are labor intensive, complicated and time-consuming due to the requirement that the xenon be separated from iodine via chromatographic or other separation methods. More importantly, significant amounts of Xe-131m or Xe-131 are not recovered using the above methods, thus requiring a substantial amount of starting material in order to recover an adequate amount of the desired xenon isotope. Thus, there is a need to provide an improved simple, safe and efficient process for producing isotopically pure Xe-131m and Xe-131. All references cited herein are incorporated by reference in their entireties.

BRIEF SUMMARY

The present invention describes a process for producing an isotopically enriched form of a desired isotope. In one embodiment of the method for producing an isotopically enriched form of a desired isotope, the steps comprise in the sequence set forth: (1) providing a reaction system having a first and second reaction zone, wherein the first reaction zone is in fluid connection with the second reaction zone, wherein the second reaction zone is otherwise closed, and wherein the first reaction zone has an opening to the surrounding environment; (2) introducing a first solution containing a parent radionuclide to the first reaction zone; (3) introducing a second solution to the first reaction zone capable of forming a precipitate containing the parent radionuclide of the first solution and a liquid byproduct; (4) sealing the opening of the first reaction zone so that the first reaction zone remains in fluid connection with the second reaction zone but is otherwise closed, (5) allowing the parent radionuclide sufficient time to decay into the desired gaseous daughter isotope; and (6) exposing the second reaction zone to temperatures below the freezing point of the desired isotope in order to collect the desired gaseous daughter isotope in the second reaction zone.

The isotopically enriched form of the desired daughter isotope can be contained until future use or used immediately after production. "Isotopically enriched," as used herein with respect to a stable daughter isotope, is defined generally as a compound composed of approximately greater than approximately 99% of a desired isotope that is essentially free of the parent radionuclide. "Isotopically enriched," as used herein with respect to a radioactive daughter isotope, is defined as a compound composed of only one radioactive isotope, but that may include a substantial amount of one or more stable isotopes that are not radioactive and do not interfere with the function of the radioactive isotope in performing a specific function.

More specifically, one embodiment of the present method is used to produce Xe-131m through decomposition of I-131 present in a precipitate compound that is present in the first reaction zone. Another embodiment also uses I-131 as the parent radionuclide to produce the stable isotope Xe-131. The formation of a precipitate containing I-131 ensures that the parent radionuclide remains immobilized in the solid.

Another embodiment of the present invention contemplates forming a precipitate containing the parent radionuclide outside the first reaction zone and subsequently introducing the precipitate to the first reaction zone where the parent radionuclide decays into the desired gaseous daughter isotope.

BRIEF DESCRIPTION OF THE DRAWINGS

These and other features, aspects, and advantages of the present invention will become better understood with reference to the following description, appended claims, and accompanied drawings where:

FIG. 1 depicts one possible reaction system that can be used to facilitate one embodiment of the present process.

DETAILED DESCRIPTION OF THE INVENTION

A method for producing an isotopically enriched compound of a desired isotope is presented. More specifically, one embodiment of the method is used for the production of the radioactive isotope Xe-131m, while another embodiment is directed to the production of the stable isotope Xe-131.

The process of producing an isotopically enriched compound of a desired isotope comprises the following steps in the sequence set forth: (1) providing a reaction system having a first and second reaction zone, wherein the first reaction zone is in fluid connection with the second reaction zone, wherein the second reaction zone is otherwise closed, and wherein the first reaction zone has an opening to the surrounding environment; (2) introducing a first solution containing a parent radionuclide to the first reaction zone; (3) introducing a second solution to the first reaction zone capable of forming a precipitate containing the parent radionuclide of the first solution and a liquid byproduct; (4) sealing the first opening of the first reaction zone so that the first reaction zone remains in fluid connection with the second reaction zone but is otherwise closed, (5) allowing the parent radionuclide sufficient time to decay into the desired gaseous daughter isotope; and (6) exposing the second reaction zone to temperatures below the freezing point of the desired isotope in order to collect the desired gaseous daughter isotope in the second reaction zone.

Providing a Reaction System Having a First and Second Reaction Zone

Generally speaking, the various embodiments of the present method can be performed in a reaction assembly having a first and second reaction zone. The first reaction zone can have one or more openings, but is otherwise closed to the outside environment. A first opening provides access to the environment outside of the reaction zone while the additional openings can be used to maintain a fluid connection with the second reaction zone to facilitate uninterrupted passage of a gas from the first reaction zone to the second reaction zone. In the event that only one opening is present in the first reaction zone, it should be capable of being modified to facilitate the transfer of a gas to a second reaction zone. The first opening of the first reaction zone should also be capable of being closed so that the contents of the first reaction zone can be isolated from the outside environment. Methods of closing the first reaction zone will be readily apparent to one of ordinary skill in the art and include but are not limited to flame-sealing, permanently or temporarily plugging with a non-diffusive barrier or otherwise preventing interaction between the outside environment and the first reaction zone. Additional openings of the first reaction zone may be connected to the second reaction zone through any means capable of maintaining an air tight fluid connection between the first and second reaction zone such that a gas or fluid can flow from one reaction zone to the other without being exposed to the outside environment, including but not limited to a tube or connecting arm.

The second reaction zone also includes one or more openings. One opening of the second reaction zone is connected, or capable of being connected, to the first reaction zone as discussed above, e.g., via a connecting arm or an opening capable of being adapted to receive a gas from the first reaction zone without loss of the gas to the outside environment during the transfer of the gas from the first reaction zone to the second reaction zone. Another opening of the second reaction zone may be connected to the outside environment, but is sealed by any method known to one of skill in the art, including but not limited to flame sealing or plugging with a break-seal or other temporary non-diffusive barrier. The reaction system may also be able to be modified so that the second reaction zone may be isolated from the first reaction zone, such as through flame sealing the connection between the two reactions zones, flame sealing a point in the second reaction zone or inserting a non-diffusive barrier between the first and second reaction zones that does not permit the flow of gas, liquid or solid between the two reaction zones, or otherwise disconnecting potential flow between the first and second reaction zones. After formation of the desired daughter isotope, the second reaction zone may be connected to a system that is evacuated so that when the seal at the second opening is broken, the daughter isotope may be transferred to a system without introducing any air into the system.

Generally, the first reaction zone may also be any container that can be sealed and subsequently purged with gas followed by sweeping the gas into a second reaction zone in order to collect the desired daughter isotope. Thus, the first reaction zone need not remain in constant fluid connection with the second reaction zone, but must only be capable of establishing a fluid connection with the second reaction zone such that the gaseous daughter isotope generated may be swept into the second reaction zone where it can be frozen out as described below.

More specifically, in one embodiment of the present invention, an apparatus similar to that depicted in FIG. 1 has proven effective in producing and recovering an isotopically enriched compound. However, the assembly of FIG. 1 is not the only means to accomplish the objective of the present method and one reasonably skilled in the art can envision a number of configurations that could be used for the multiple embodiments of the present invention.

FIG. 1 generally depicts a dual test tube assembly 7 with a connecting arm 10. With reference to FIG. 1, there is a first reaction zone 1 having an opening 11 to the outside environment that can be closed during operation at point 2 or any other point above the connecting arm 10. The first reaction zone also includes a headspace 8 that is interposed between the lower end of the first reaction zone 1 and the point 2 at which the first reaction zone 1 is sealed. The reaction assembly of FIG. 1 also depicts a second reaction zone 4 having an opening 12 that is open to the outside environment that can be closed during operation at point 6 or any point above the connecting arm 10. The second reaction zone 4 also includes a headspace 9 that is interposed between the lower end of the second reaction zone 4 and the point 6 at which the second reaction zone 4 is sealed. The first 1 and second 4 reaction zones are connected through a connecting arm 10. The connecting arm 10 can be closed at point 3 or any point between the first 1 and second 4 reaction zones in order to isolate the second reaction zone 4 from the first reaction zone 1.

Precipitation of Parent Radionuclide

In the first step of precipitating the parent radionuclide, two or more solutions, at least one of which contains the parent radionuclide, are mixed in the first reaction zone of a reaction assembly, as described below, in order to form a precipitate containing the parent radionuclide. After the precipitate is formed and any liquid byproduct is removed, the first reaction zone is sealed from the outside environment.

It is also within the scope of the present invention to form and dry the precipitate outside of the first reaction zone. Subsequently, the precipitate containing the parent radionuclide is placed in the first reaction zone, which is sealed, e.g., flame-sealed, and subsequently begins the decay process.

First Solution Containing Parent Radionuclide

With reference to FIG. 1, in one embodiment of the present invention, a first solution containing a parent radionuclide is introduced to the first reaction zone 1 of the reaction assembly 7. The solution may be any composition that will facilitate subsequent precipitation with a compound of the second solution.

In one embodiment of the present invention, the radionuclide can be contained within a basic solution, i.e., a solution having a pH greater than 7. For example, a parent radionuclide such as I-131 of a specified activity may be contained within a solution of sodium hydroxide (NaOH). Additional solutions in which the parent radionuclide may be contained include but are not limited to solutions of potassium hydroxide (KOH), ammonium hydroxide ($NH_3$aq), barium hydroxide ($Ba(OH)_2$), caesium hydroxide (CsOH), strontium hydroxide ($Sr(OH)_2$), lithium hydroxide (LiOH), rubidium hydroxide (RbOH), magnesium hydroxide ($Mg(OH)_2$), or sodium carbonate ($Na_2CO_3$). In the case of the parent radionuclide I-131, the primary purpose of providing the parent radionuclide in a basic solution is to maintain the iodine in the form of $I^-$ (iodide) to ensure that it does not oxidize to $I_2$. In the event that iodine oxidizes to $I_2$, it will escape the solution and the process will become less efficient in recovering maximum amounts of the daughter isotope, Xe-131, in the case of I-131 as the parent radionuclide.

Mixing Second Solution with First Solution to Form Precipitate Containing Parent Radionuclide Next, the first solution in the first reaction zone is mixed with one or more second solutions, at least one of which contains compounds capable of forming a precipitate containing the parent radionuclide in the first reaction zone 1. The precipitation causes the parent radionuclide that will produce the desired daughter isotope to become immobilized in the precipitate contained in the first reaction zone 1. It is generally preferable to use excess amounts of the solution that will form the precipitate with the parent radionuclide in order to ensure that all of the parent radionuclide precipitates and achieve maximum recovery of the daughter isotope.

For example, in the case of the parent radionuclide I-131 contained in a NaOH solution in the first reaction zone, palladium (II) chloride can be added to the first reaction zone in order to form a precipitate of $PdI_2$ in which the iodine is comprised, in part, of I-131. Alternatively, the one or more second solutions may consist of an aqueous solution containing silver chloride, which will similarly form the precipitate $AgI_2$ containing I-131. While ionic compounds such as palladium (II) chloride and silver chloride are recited as examples of solutions capable of forming a precipitate with the parent radionuclide I-131 due to their solubility in water and acid, it is understood that any metal ion that is soluble and capable of forming a precipitate containing the parent radionuclide may be used in this process.

A liquid byproduct may remain in the first reaction zone after precipitation of the parent radionuclide is complete.

Removing Liquid Byproduct from First Reaction Zone

In the event that the first reaction zone contains a non-precipitate liquid byproduct in addition to the precipitate, the liquid byproduct may be removed from the first reaction zone 1 by any means know to one skilled in the art capable of removing the liquid byproduct from the first reaction zone 1 without disturbing the precipitate. The primary goal in removing the non-precipitate liquid byproduct from the first reaction zone is to prevent boiling the solution or agitating the surface of the precipitate that might lead to a loss of any of the parent radionuclide from the precipitate. For example, evaporation of the liquid byproduct can be accomplished through application of a gentle stream of nitrogen to the precipitate under a heat lamp. Other means for removing the liquid byproduct include but are not limited to vacuum extraction or pipetting. The means by which removing the liquid byproduct, if performed, is accomplished is not an integral part of the present method.

Drying the Precipitate

The precipitate present in the first reaction zone may be further dried by applying a gentle stream of nitrogen under a heat lamp, neither of which is depicted in FIG. 1, or any other method known to one of skill in the art capable of sufficiently drying the precipitate. The step of drying may be accomplished simultaneously with removal of any liquid byproduct formed depending on the method used for the removal of the liquid byproduct discussed above. For example, applying a gentle stream of nitrogen under a heat lamp may both evaporate the liquid byproduct and sufficiently dry the precipitate. The means by which drying the precipitate, if performed, is accomplished is not an integral part of the present method.

Sealing the Reaction Assembly

After the precipitate has been formed in the first reaction zone and the optional steps of drying the precipitate and removing the liquid byproduct are completed, the reaction assembly may be sealed at point 2 or closed at any point that isolates the first reaction zone from the outside environment through a gas-tight seal. Seal point 2 can be sealed in any manner that will prevent the escape of the gaseous daughter isotope to be produced, for example, flame sealing the test tube depicted in FIG. 1 at point 2 or plugging the opening to the outside environment with a non-diffusive barrier. However, the primary objective is to create and maintain a gas tight seal so that the gaseous daughter isotope cannot escape the reaction assembly. The contents of the reaction assembly 7 are further isolated from the environment by a brake seal 6, or other gas tight sealing means, in the second reaction zone 4.

Decay of Parent Radionuclide

The parent radionuclide immobilized in the precipitate contained in the first reaction zone 1 is allowed sufficient time to decay, emitting the desired daughter isotope as a gas that collects in the headspace 8, 9 of the first and second reaction zone, respectively. By "sufficient time," it is meant that the parent radionuclide is permitted to undergo decay for an amount of time sufficient to produce the desired amount of daughter isotope. For example, allowing a parent radionuclide to decay for approximately 8 half-lives would theoretically allow for recovery of approximately 99.61% ($100 \times 1/2^8 = 0.39\%$ parent radionuclide remaining) of the daughter isotope in comparison to the parent radionuclide starting material.

By way of example, in the case of the radioactive isotope Xe-131m, a maximum amount of Xe-131m is present after 14 days and decreases thereafter (Table 1). Thus, permitting the parent radionuclide to decay for greater than 14 days will not result in additional Xe-131m being formed because at that time period the initial Xe-131m formed is decaying into the stable isotope Xe-131.

In the case of Xe-131, approximately every 8 days, half of the I-131 present in the starting material will decompose into Xe-131. Thus, after about 8 days, approximately 50% of the I-131 will be Xe-131; after 16 days, 75% of the I-131 will be Xe-131; after 24 days, 87.5% of the I-131 will be Xe-131; and so forth. Generally, allowing a parent radionuclide to decay for the equivalent of 8 half-lives will convert approximately 99.6% of the starting material of parent radionuclide into the daughter isotope. After allowing the parent radionuclide in the precipitate to undergo decay for a sufficient time to produce the desired amount of daughter isotope, the daughter isotope must be collected from the headspace 8, 9 of the first 1 and second 4 reaction zone and isolated from the precipitate and collected for its intended use.

Collection of Desired Gaseous Isotope from Headspace

In order to collect the gaseous daughter isotope into the second reaction zone 4 and separate it from the solid precipitate and the first reaction zone 1, the second reaction zone 4 is exposed to temperatures below the freezing point of the gaseous daughter isotope. For example, immersing the second reaction zone in a dewar containing liquid nitrogen will accomplish this objective for most daughter isotopes. Alternatively, any means that exposes the second reaction zone to temperatures below the freezing point of the daughter isotope will accomplish the objective of solidifying the daughter isotope, including but not limited to immersing the second reaction zone in liquid hydrogen, liquid oxygen or liquid helium. Similarly, increasing the pressure inside the reaction assembly will raise the temperature at which the daughter isotope will freeze thereby increasing the options in terms of methods, operating conditions and materials by which to expose the reaction assembly to freezing temperatures and solidify the daughter isotope.

The low temperatures in the second reaction zone 4 cause the desired gaseous daughter isotope to "freeze" into the second reaction zone 4 as a solid. Thus, a compound of the desired isotope in the form of a solid is collected in the bottom of the second reaction zone 4. The second reaction zone 4 need only be exposed to the freezing temperatures for a time sufficient to freeze the desired amount of gaseous daughter isotope into the second reaction zone 4 as a solid daughter isotope.

Thereafter, the second reaction zone 4 is sealed at point 3 or 5 in order to isolate the desired isotope for further use and prevent loss of the isotope into the environment outside the second reaction zone 4. Alternatively, the solid daughter isotope could be immediately removed from the second reaction zone 4 for its intended use upon forming the desired amount of solid.

For example, where the desired daughter isotope is radioactive Xe-131 or stable Xe-131, the second reaction zone 4 is immersed in liquid nitrogen, or exposed to conditions below the freezing point of the daughter isotope, for approximately 5 minutes. The freezing point of xenon is −111.7° C. while the temperature of liquid nitrogen is approximately −196° C. These conditions effectively freeze all of the Xe-131m or Xe-131 present in the reaction assembly 7 into the second reaction zone 4.

More specifically, various embodiments of the present method can be described by reference to following examples.

EXAMPLE 1

Potassium iodide (Fisher Chemical) was diluted to 14 mg iodide/mL with deionized water containing 0.5% of 20% sodium sulfite (Fisher Chemical). Concentrated hydrochloric acid (Fisher Chemical) was diluted to 2M with deionized water. Palladium (II) chloride (Fisher Chemical), 1.8 g, was dissolved in 4 mL of concentrated hydrochloric acid and diluted to 50 mL with deionized water. Iodine-131 in 0.1 M sodium hydroxide solution was obtained from Perkins Elmer (Boston, Mass.) for these examples.

First, 100 μL of sodium hydroxide solution having an activity for I-131 of approximately 1 mCi was added to a dual test tube assembly similar to that depicted in FIG. 1. However, one of ordinary skill in the art can envision compatible assemblies other than that depicted in FIG. 1, including assemblies using two or more reaction zones (depicted as test tubes in FIG. 1) of various shapes and sizes, in performing the process of the present invention.

Next, 30 μL of 2M HCl was added to the 100 μL of the iodide solution containing I-131. Finally, 0.2 mL of 0.2M palladium chloride was added to form a precipitate of palladium iodide. Alternatively, silver chloride could be used in place of palladium chloride to precipitate the iodide in this example. In addition to the palladium iodide precipitate, a liquid byproduct consisting of HCl, chloride and excess palladium remained in the first reaction zone.

The liquid byproduct was removed by evaporation and the palladium iodide precipitate was dried under a heat lamp in the presence of a slow nitrogen purge. Activity of I-131 was measured by gamma ray spectroscopy, with the activity of I-131 before and after the palladium iodide precipitate was dried being within measurement error of the assay, thus indicating no loss of I-131.

After the palladium iodide precipitate was sufficiently dried, the dual test tube assembly 7 was flame sealed at point 2 in order to trap all of the Xe-131m that would be produced in the head space of the first and second reaction zone. As described above, 14 days is the preferred amount of time in which to allow maximum formation of Xe-131m through the beta decay of I-131 present in the palladium iodide precipitate contained in the first reaction zone 1. Specifically, gaseous Xe-131m forms in the head space of the first 1 and second 4 reaction zone as the I-131 decays. After 14 days, there was no loss of I-131 other than due to decay in the closed system.

Subsequently, isotopically enriched Xe-131m was collected by freezing the Xe-131m into the second reaction zone 4, which is depicted in FIG. 1 as an evacuated test tube. As depicted in FIG. 1, the second reaction zone 4 is connected to the first reaction zone 1 through a connecting arm 3. In this example, the second reaction zone was immersed in a dewar containing liquid nitrogen (not pictured) in order to freeze the Xe-131m into the second reaction zone 4 in the form of a solid. Thus, the Xe-131m is pulled out of the headspaces to the cold spot in the second reaction zone 4 created by the presence of liquid nitrogen and forms as a solid.

Upon application of freezing conditions to the second reaction zone 4 for approximately 5 minutes in the case of liquid nitrogen, the Xe-131m froze out of the headspaces 8, 9 and into the second reaction zone 4 as a solid, leaving the palladium iodide precipitate behind in the first reaction zone 1. The second reaction zone 4 containing the Xe-131m was then sealed at point 3.

The sealed second reaction zone 4 was then warmed to room temperature and assayed by gamma ray spectroscopy (using a planar high purity germanium detector) in order to determine the amount of Xe-131m produced and to determine if any I-131 odine was present in the sample. This process resulted in a sample of Xe-131m essentially free of I-131.

EXAMPLE 2

Another embodiment of the present method substantially followed the method set forth in Example 1. However, the first reaction zone 1 was sealed with atmospheric pressure inside after forming the precipitate and removing the liquid byproduct. This resulted in a greater yield of Xe-131m, 25% of theoretical.

In addition, it was discovered that significant amounts of Xe-131m could be recovered by heating the palladium iodide precipitate while the second reaction zone 4 was exposed to cryogenic conditions. However, this modification caused I-131 to be present in the final sample collected in the second reaction zone 4 resulting in an undesirable contaminant in light of the present methods' intent to produce an isotopically enriched form of Xe-131m.

EXAMPLE 3

In another embodiment of the present process, which was found to be the most effective for producing Xe-131m, the method of Example 1 was substantially followed with one minor alteration. The additional step consisted of adding natural xenon to the first reaction zone prior to sealing. The additional xenon reduced the pressure in the dual test tube assembly to less than atmospheric. In addition, the additional xenon acted as a carrier for the Xe-131m that formed in the dual test tube assembly, thus increasing the amount of Xe-131m collected in the second reaction zone 4. This method resulted in a yield of Xe-131m of 50% theoretical that was free of I-131, as determined by gamma ray spectroscopy.

EXAMPLE 4

In order to achieve the production of the stable form of Xe-131 according to the present invention, the above methods can be followed with one adjustment. Instead of performing the freezing out as described above after 14 days under seal, the parent radionuclide and daughter metastable isotope Xe-131m are allowed to remain under seal for an additional 16-76 days, thus resulting in a total decomposition time of 30-90 days. This extra time allows a substantial amount of the Xe-131m formed to transition to Xe-131, as well as allow greater amounts of the I-131 to decay to Xe-131. At this point, the stable isotope Xe-131 is frozen out and collected into the second reaction zone 4 as described above. It has been determined that a starting sample having 1 Ci of activity for I-131 would theoretically produce approximately 8 micrograms of isotopically enriched Xe-131 if allowed to undergo complete decay.

EXAMPLE 5

This method should also be sufficient to produce other daughter isotopes that are produced as a gas from the decay of a parent radionuclide that can be immobilized within a precipitate.

For example, rubidium-81 (Rb-81) decays with a physical half-life of approximately 4.5 hours to its metastable daughter isotope Krypton-81m (Kr-81m). Krypton-81m decays by isomeric transition to stable isotope Kr-81, emitting pure gamma radiation of 191 keV. Kr-81 is itself radioactive and decays to stable Br-81 with a half-life of approximately $2.1 \times 10^5$ years. Thus, immobilizing Rb-81 in a precipitate, such as in the form of a carbonate or hydroxide, in the first reaction zone for an appropriate amount of time will presumably yield an isotopically enriched form of Kr-81m. The isotopically enriched Kr-81m can be frozen into the second reaction zone in accordance with any one of the above-described embodiments by exposing the second reaction zone to temperatures below the freezing point of Kr (−157.36° C.). In addition, allowing the decay process to continue for an appropriate amount of time will presumably yield isotopically enriched radioactive, but relatively stable, Kr-81 that can be collected in the second reaction zone in a similar manner for further isolation and use.

An embodiment of the present invention will also likely sufficiently produce quantities of Pb-207. For example, radium-223 (Ra-223) decays with a physical half-life of 11.4 days to its stable daughter-isotope Pb-207 (Pb-207). Radium-223 decays to Pb-207 after a number of transitions, including producing radioactive Pb-211. Thus, immobilizing Ra-223 in a precipitate in the first reaction zone for an appropriate amount of time will presumably yield an isotopically enriched form of Pb-207. The isotopically enriched radioactive Pb-207 can be frozen into the second reaction zone in accordance with the above-described processes through a combination of pressure and temperature due to the high melting point of lead. In addition, allowing the decay process to continue for an appropriate amount of time will presumably yield isotopically enriched radioactive Pb-211 that can be collected in the second reaction zone in a similar manner for further isolation and subsequent use. However, the radioactive Pb-211 must be used quickly as its half-life is 36 minutes.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶ 6. In particular, the use of "step of" in the claims herein is not intended to invoke the provisions of 35 U.S.C. §112, ¶6.

What is claimed is:

1. A method of producing an isotopically enriched compound of an isotope comprising:
    (a) providing a reaction system having a first reaction zone and a second reaction zone, wherein the first reaction zone is in fluid connection with the second reaction zone, wherein the second reaction zone is otherwise closed, and wherein the first reaction zone also has an opening to the surrounding environment;
    (b) placing a precipitate containing a parent radionuclide in the first reaction zone;
    (c) sealing the opening of the first reaction zone wherein the first reaction zone remains in fluid connection with the second reaction zone;
    (d) allowing sufficient time for the parent radionuclide to decay into a gaseous daughter isotope; and
    (e) exposing the second reaction zone to temperatures below the freezing point of the daughter isotope in order to collect the daughter radioisotope in the second reaction zone as a solid.

2. The method as recited in claim 1 wherein the parent radionuclide of the precipitate placed in the first reaction zone is I-131.

3. The method as recited in claim 2 wherein the I-131 is allowed to decay between approximately 7 and 21 days in order to obtain isotopically enriched Xe-131m.

4. The method as recited in claim 2 wherein the I-131 is allowed to decay between approximately 30 and 90 days in order to obtain isotopically enriched Xe-131.

5. A method of producing an isotopically enriched compound of an isotope comprising:
   (a) providing a reaction system having a first reaction zone and a second reaction zone, wherein the first reaction zone is in fluid connection with the second reaction zone, wherein the second reaction zone is otherwise closed, and wherein the first reaction zone also has an opening to the surrounding environment;
   (b) introducing a first solution comprising a parent radionuclide to the first reaction zone;
   (c) mixing the first solution with one or more second solutions in the first reaction zone, wherein a precipitate containing the parent radionuclide of the first solution is formed in the first reaction zone;
   (d) sealing the opening of the first reaction zone wherein the first reaction zone remains in fluid connection with the second reaction zone;
   (e) allowing sufficient time for the parent radionuclide to decay into a gaseous daughter isotope; and
   (f) exposing the second reaction zone to temperatures below the freezing point of the daughter isotope wherein the daughter isotope is collected in the second reaction zone as a solid.

6. A method of producing an isotopically enriched compound of xenon comprising:
   (a) providing a reaction system having a first reaction zone and a second reaction zone, wherein the first reaction zone is in fluid connection with the second reaction zone, wherein the second reaction zone is otherwise closed, and wherein the first reaction zone also has an opening to the surrounding environment;
   (b) introducing a first solution comprising I-131 to the first reaction zone;
   (c) mixing the first solution with one or more second solutions in the first reaction zone, wherein a precipitate containing I-131 is formed in the first reaction zone;
   (d) sealing the opening of the first reaction zone wherein the first reaction zone remains in fluid connection with the second reaction zone;
   (e) allowing sufficient time for the I-131 to decay into an isotope of xenon; and
   (f) exposing the second reaction zone to temperatures below the freezing point of xenon wherein the xenon isotope is collected in the second reaction zone as a solid.

7. The method as recited in claim 6 wherein the I-131 is allowed to decay between approximately 7 and 21 days in order to obtain an isotopically enriched compound of the radioactive isotope Xe-131m.

8. The method as recited in claim 7 wherein the mixing of the first solution with one or more second solutions of step (c) also forms a liquid byproduct and further comprising the step of removing the liquid byproduct from the first reaction zone.

9. The method as recited in claim 7 further comprising the step of drying the precipitate containing I-131 in the first reaction zone.

10. The method as recited in claim 7 wherein the pressure of the first reaction zone is atmospheric pressure.

11. The method as recited in claim 7 wherein the pressure of the first reaction zone is less than atmospheric pressure.

12. The method as recited in claim 7 further comprising the step of sealing the second reaction zone from the first reaction zone after step (f) in claim 6.

13. The method as recited in claim 7 wherein the first solution consists of a basic solution.

14. The method as recited in claim 7 wherein the first solution containing the I-131 is selected from the group consisting of sodium hydroxide, ammonium hydroxide and potassium hydroxide.

15. The method as recited in claim 14 wherein the one or more second solutions is selected from the group consisting of palladium chloride and silver chloride.

16. The method as recited in claim 7 wherein the second reaction zone is exposed to temperatures below approximately $-112°$ C.

17. The method as recited in claim 7 wherein step (f) is performed by immersing the second reaction zone in a dewar containing liquid nitrogen.

18. The method as recited in claim 7 wherein natural xenon is added to the first reaction zone prior to sealing the opening of the first reaction zone.

19. The method as recited in claim 7 wherein I-131 is allowed to decay for a period of approximately 14 days.

20. The method as recited in claim 6 wherein the I-131 is allowed to decay between approximately 30 and 90 days in order to obtain an isotopically enriched compound of the stable isotope Xe-131.

21. The method as recited in claim 20 wherein the mixing of the first solution with one or more second solutions of step (c) also forms a liquid byproduct and further comprising the step of removing the liquid byproduct from the first reaction zone.

22. The method as recited in claim 20 further comprising the step of drying the precipitate containing I-131 in the first reaction zone.

23. The method as recited in claim 20 wherein the pressure of the first reaction zone is atmospheric pressure.

24. The method as recited in claim 20 further comprising the step of sealing the second reaction zone from the first reaction zone after step (f) in claim 6.

25. The method as recited in claim 20 wherein the first solution containing I-131 consists of a basic solution.

26. The method as recited in claim 20 wherein the first solution containing the I-131 is selected from the group consisting of sodium hydroxide, ammonium hydroxide and potassium hydroxide.

27. The method as recited in claim 26 wherein the second solution is selected from the group consisting of palladium chloride and silver chloride.

28. The method as recited in claim 20 wherein the second reaction zone is exposed to temperatures below approximately $-112°$ C.

29. The method as recited in claim 20 wherein step (f) is performed by immersing the second reaction zone in a dewar containing liquid nitrogen.

* * * * *